US012726026B2

(12) United States Patent
Zhou et al.

(10) Patent No.: US 12,726,026 B2
(45) Date of Patent: Sep. 1, 2026

(54) BLOCKCHAIN-BASED ELECTRICITY TRADING METHOD AND SYSTEM IN VIRTUAL POWER PLANT ENVIRONMENT

(71) Applicant: Hefei University of Technology, Hefei (CN)

(72) Inventors: Kaile Zhou, Hefei (CN); Hengheng Xing, Hefei (CN); Xinhui Lu, Hefei (CN)

(73) Assignee: Hefei University of Technology, Hefei (CN)

( * ) Notice: Subject to any disclaimer, the term of this patent is extended or adjusted under 35 U.S.C. 154(b) by 66 days.

(21) Appl. No.: 18/307,937

(22) Filed: Apr. 27, 2023

(65) Prior Publication Data

US 2024/0170963 A1 May 23, 2024

(30) Foreign Application Priority Data

Nov. 14, 2022 (CN) ......................... 202211422263.2

(51) Int. Cl.
*H02J 3/008* (2026.01)
*G06Q 40/04* (2012.01)
*G06Q 40/06* (2012.01)
*G06Q 50/06* (2012.01)
*H02J 3/00* (2006.01)

(52) U.S. Cl.
CPC .............. *H02J 3/008* (2013.01); *G06Q 40/04* (2013.01); *G06Q 50/06* (2013.01); *H02J 3/003* (2020.01)

(58) Field of Classification Search
CPC .......... H02J 3/008; H02J 3/003; G06Q 40/04; G06Q 50/06
See application file for complete search history.

(56) References Cited

U.S. PATENT DOCUMENTS 11,811,229 B2 * 11/2023 Hövelhaus ......... G06Q 30/0206
2016/0098794 A1 * 4/2016 Mokhtari ............... G06Q 40/04 705/37
2022/0284458 A1 * 9/2022 Sun .................... G06Q 30/0206

FOREIGN PATENT DOCUMENTS

CN 117993942 * 11/2022 ............. Y04S 10/50
JP 2021501557 * 10/2018 .............. H02J 3/008

OTHER PUBLICATIONS

Japanese patent published Jan. 14, 2021 (Year: 2021).*
Chinese patent filed Nov. 4, 2022 (Year: 2022).*

* cited by examiner

*Primary Examiner* — Scott S Trotter

(57) ABSTRACT

A blockchain-based electricity trading method and system are disclosed. Based on the initial trading plan of the user in the virtual power plant, a non-cooperative game model among multiple users and the virtual power plant is constructed, a purchase price, a sale price and a demand response compensation price of a trading between the user and the virtual power plant during t period are determined; according to the above results, a final load demand of user i, a charging capacity or discharging capacity of the energy storage device of user i, as well as a purchase electricity quantity or sale electricity quantity of a trading with the virtual power plant during t period are determined, and a final trading scheme is formed; and based on the final trading scheme, both trading parties are matched, a trading contract is generated and a verification is performed.

8 Claims, 2 Drawing Sheets

Based on a planned load demand of user *i* during *t* period, a distributed energy equipment output forecasting data, an energy storage device state during a previous period and a purchase price and a sale price of a trading with a virtual power plant during the previous period, with a goal of minimizing a planned power cost of the user during *t* period, optimizing a cost of the user participating in the power trading, determining a planned purchase power quantity or sale power quantity of the trading between the user and the virtual power plant operator, as well as a planned charging capacity or discharging capacity of the energy storage device, and obtaining an initial trading plan of user *i* during *t* period Based on the initial trading plan of the user in the virtual power plant, constructing a non-cooperative game model between a plurality of users and the virtual power plant, determining a purchase price, a sale price and a demand response compensation price of a trading between the user and the virtual power plant during *t* period According to the purchase price, the sale price and the demand response compensation price of a trading between the user and the virtual power plant during *t* period, determining a final load demand of user *i*, a charging capacity or discharging capacity of the energy storage device, as well as a purchase power quantity or sale power quantity of a trading with the virtual power plant operator during *t* period, and forming a final trading scheme Based on the final trading scheme during *t* period, matching both trading parties, generating a transaction contract and performing a verification.

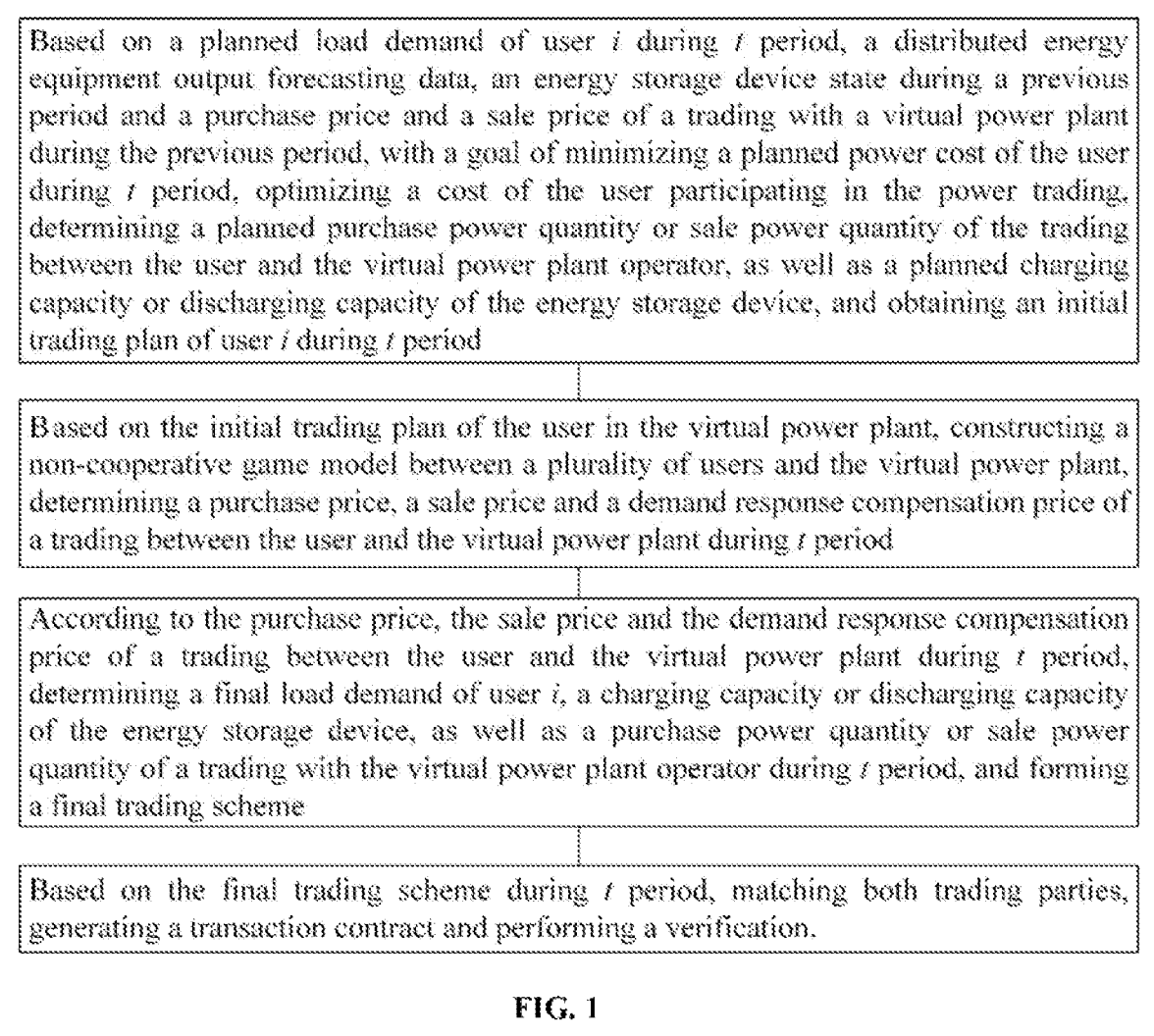

Based on a planned load demand of user $i$ during $t$ period, a distributed energy equipment output forecasting data, an energy storage device state during a previous period and a purchase price and a sale price of a trading with a virtual power plant during the previous period, with a goal of minimizing a planned power cost of the user during $t$ period, optimizing a cost of the user participating in the power trading, determining a planned purchase power quantity or sale power quantity of the trading between the user and the virtual power plant operator, as well as a planned charging capacity or discharging capacity of the energy storage device, and obtaining an initial trading plan of user $i$ during $t$ period Based on the initial trading plan of the user in the virtual power plant, constructing a non-cooperative game model between a plurality of users and the virtual power plant, determining a purchase price, a sale price and a demand response compensation price of a trading between the user and the virtual power plant during $t$ period According to the purchase price, the sale price and the demand response compensation price of a trading between the user and the virtual power plant during $t$ period, determining a final load demand of user $i$, a charging capacity or discharging capacity of the energy storage device, as well as a purchase power quantity or sale power quantity of a trading with the virtual power plant operator during $t$ period, and forming a final trading scheme Based on the final trading scheme during $t$ period, matching both trading parties, generating a transaction contract and performing a verification.

FIG. 1

BLOCKCHAIN-BASED ELECTRICITY TRADING METHOD AND SYSTEM IN VIRTUAL POWER PLANT ENVIRONMENT

This application claims priority to Patent Application No. 2022114222632, entitled "Block chain-based power transaction method and system in virtual power plant environment", filed on Nov. 14, 2022 before the CNIPA, the contents of which are incorporated herein by reference.

CROSS REFERENCE TO RELATED APPLICATION

This patent application claims the benefit and priority of Chinese Patent Application No. 2022114222632 filed on Nov. 14, 2022, the disclosure of which is incorporated by reference herein in its entirety as part of the present application.

TECHNICAL FIELD

The present disclosure relates to the technical field of blockchain, and more specifically, to a blockchain-based electricity trading method and system in a virtual power plant environment.

BACKGROUND ART

With the rapid popularization and development of distributed energy resources, traditional electricity consumers gradually transform into electricity prosumers with both electricity production and consumption. However, when the distributed energy resources operate independently, the output thereof are random, intermittent and fluctuating, and when a large amount of distributed energy resources are connected to a traditional large power system, the electricity supply safety and reliability of the power system will be threatened.

However, the key to the operation of existing virtual power plants lies in the flexible control of different distributed energy resources in the region. However, when faced with characteristics such as randomness, fluctuation and hard storage of distributed energy resources, it is often difficult to achieve an ideal utilization rate when controlling the distributed energy resources, that is, the energy utilization rate in an existing power system in a virtual power plant environment is low.

SUMMARY

(1) Technical Problems to be Solved

In view of the shortcomings of the prior art, the disclosure provides a blockchain-based electricity trading method and system in a virtual power plant environment, which solves the technical problem of low energy utilization in the existing electricity trading system in a virtual power plant environment.

(2) Technical Solutions

In order to achieve the above object, the present disclosure is achieved by the following technical solutions:

In a first aspect, the disclosure provides a blockchain-based electricity trading method in a virtual power plant environment, and the method includes:

S1. based on a planned load demand of user i during t period, a distributed energy equipment output forecasting data of user i during t period, an energy storage device state of user i during a previous t period and a purchase price and a sale price of a trading with a virtual power plant during the previous t period, with a goal of minimizing a planned electricity cost of the user i during t period, optimizing a cost of the user participating in the electricity trading, determining a planned purchase electricity quantity or sale electricity quantity of the trading between the user and the virtual power plant, as well as a planned charging capacity or discharging capacity of the energy storage device, and obtaining an initial trading plan of user i during t period;

S2. based on the initial trading plan of the users in the virtual power plant, constructing a non-cooperative game model among multiple users and the virtual power plant, determining a purchase price, a sale price and a demand response compensation price of a trading among the users and the virtual power plant during t period;

S3. according to the purchase price, the sale price and the demand response compensation price of a trading among the users and the virtual power plant during t period, determining a final load demand of user i, a charging capacity or discharging capacity of the energy storage device, as well as a purchase electricity quantity or sale electricity quantity of a trading with the virtual power plant during t period, and forming a final trading scheme; and S4. based on the final trading scheme during t period, matching both trading parties, generating a trading contract and performing a verification.

Preferably, a planned electricity cost function of user i is:

$$C'_{i,t} = C^{vpp'}_{i,t} + C^{ess'}_{i,t} + C^{der'}_{i,t}$$

$$\text{s.t.}\begin{cases} C^{vpp'}_{i,t} = \lambda^{vb}_{t-\Delta t} \square P^{vb'}_{i,t} - \lambda^{vs}_{t-\Delta t} \sqsupset P^{vs'}_{i,t} \\ C^{ess'}_{i,t} = \pi^{ess}_{i} \square \left(P^{ch'}_{i,t} + P^{des'}_{i,t} + P^{static'}_{i,t}\right) \\ C^{der'}_{i,t} = \pi^{der}_{i} \square P^{der'}_{i,t} \\ P^{load'}_{i,t} = P^{der'}_{i,t} + P^{vb'}_{i,t} - P^{vs'}_{i,t} + P^{dis'}_{i,t} - P^{ch'}_{i,t} \\ E'_{i,t} = E_{i,t-\Delta t} + P^{ch'}_{i,t} \square \eta_{ch} - \dfrac{P^{dis'}_{i,t}}{\eta_{dis}} \\ 0 \le E'_{i,t} \le \overline{E}_{i} \\ 0 \le P^{dis'}_{i,t} \le \overline{P}^{dis}_{i,t} \square D^{dis}_{t} \\ 0 \le P^{ch'}_{i,t} \le \overline{P}^{ch}_{t} \square D^{ch}_{t} \\ D^{static}_{t} \square P^{static'}_{t} = 0 \\ D^{dis}_{i} + D^{ch}_{t} + D^{static}_{t} \le 1 \\ 0 \le P^{der'}_{i,t} \le \overline{P}^{der}_{i,t} \end{cases},$$

wherein, $$C'_{i,t}$$

is a planned electricity cost of user i during t period;

$$C^{vpp}_{i,t}$$

is a planned electricity cost of a trading between user i and the virtual power plant during t period;

$$C_{i,t}^{ess\prime}$$

is a planned energy storage cost of user i during t period;

$$C_{i,t}^{der\prime}$$

is a planned distributed energy equipment generation cost of user i during t period;

$$\pi_i^{ess}$$

is a unit cost of energy storage of user i;

$$P_{i,t}^{static\prime}$$

is a planned energy storage state of user i during t period;

$$\pi_i^{der}$$

is an unit cost of own distributed energy resources equipment output of user i; $\eta_{ch}$ and $\eta_{dis}$ is a charging efficiency and discharging efficiency of the energy storage, respectively; $\overline{E}_i$ is an maximum capacity limit of the energy storage device of user i;

$$E_{i,t}^{\prime}$$

is a planned energy storage capacity of user i during t period; $E_{i,t-\Delta t}$ is an energy storage capacity of user i in the previous t period;

$$\overline{P}_t^{ch} \text{ and } \overline{P}_t^{dis}$$

is an upper limit of charging and discharging of the energy storage device during t period, respectively;

$$D_t^{ch},\ D_t^{dis},\ \text{and } D_t^{static}$$

are 0-1 variables representing the charging, discharging, and static states of the energy storage device during t period;

$$\overline{P}_{i,t}^{der}$$

is a maximum electricity generation of the distributed energy equipment of user i during t period;

$$P_{i,t}^{load\prime}$$

is the planned load demand of user i during t period;

$$\lambda_{t-\Delta t}^{vb} \text{ and } \lambda_{t-\Delta t}^{vs}$$

is the distributed energy equipment output forecasting data of user i during t period;

$$P_{i,t}^{der}$$

are the purchase price and the sale price of a trading among the users and the virtual power plant during a previous t period;

$$P_{i,t}^{vb\prime} \text{ and } P_{i,t}^{vs\prime}$$

are the planned purchase electricity quantity and the planned sale electricity quantity of a trading between user i and the virtual power plant during t period;

$$P_{i,t}^{ch\prime} \text{ and } P_{i,t}^{dis\prime}$$

are the planned charging capacity and the planned discharging capacity of the energy storage device of user i during t period, respectively.

Preferably, the non-cooperative game model includes:

$$G=(L;S;U)$$

- wherein, L, S and U are participants, strategies and utility of the game model, respectively;
- participants refer to the virtual power plant operator and user nodes submitting trading plans;
- the strategies include: a trading electricity quantity among users and virtual power plant during t period, and a trading electricity price among virtual power plant and users;
- the utility includes the utility of users and the utility of virtual power plant.

Preferably, a utility function of the user is as follows:

$$U_{i,t}=-C_{i,t}^{\prime}$$

a utility function of the virtual power plant is as follows:

$$U_t^{VPP}=C_t^{sell}-C_t^{buy}+C_t^{grid}+C_t^{e}$$

wherein, $$U_t^{VPP}$$

is an overall cost of the virtual power plant during t period;

$$C_t^{buy} \text{ and } C_t^{sell}$$

are an electricity purchase cost and an electricity sale cost from users participating in a trading to the virtual power plant, respectively;

$$C_t^{e}$$

is an incentive cost of compensation for users participating in demand response in the virtual power plant;

$$C_t^{grid}$$

is a cost of trading with the main grid; and the utility function of the virtual power plant operator is constrained as follows:

$$\text{s.t.}\begin{cases} C_t^{sell} = \lambda_t^{vs}\sum_{i=1}^{N} P_{i,t}^{vb} \\ C_t^{buy} = \lambda_t^{vb}\sum_{i=1}^{N} P_{i,t}^{vs} \\ C_t^{grid} = \max\left(\sum_{i=1}^{N} P_{i,t}^{b} - \sum_{i=1}^{N} P_{i,t}^{s},\ 0\right)\lambda_t^{gs} + \min\left(\sum_{n=1}^{N} P_{i,t}^{b} - \sum_{n=1}^{N} P_{i,t}^{s},\ 0\right)\lambda_t^{gb} \\ C_t^{e} = \sum_{i=1}^{N}\sum_{t\in T}\lambda_e\left(\Delta P_{i,t}^{s} + \Delta P_{i,t}^{c}\right) \\ \lambda_t^{gb} < \lambda_t^{vs} < \lambda_t^{gs} \\ \lambda_t^{gb} < \lambda_t^{vb} < \lambda_t^{gs} \\ \lambda_t^{gb} < \lambda_e < \lambda_t^{gs} \end{cases}$$

wherein, $$\lambda_t^{gs} \text{ and } \lambda_t^{gb}$$

are a sale price and a purchase price of a trading between the virtual power plant and the main grid during t period, respectively;

$$\Delta P_{i,t}^{s}$$

is a translatable load of the user i during t period;

$$\Delta P_{i,t}^{c}$$

is a reducible load of the user i during t period; i is the user; N is the number of users participating in the virtual power plant trading; T is a total time period of users participating in the virtual power plant trading;

$$\lambda_t^{vb},\ \lambda_t^{vs} \text{ and } \lambda_e$$

are the purchase price, the sale price and the demand response compensation price of the trading among the users and virtual power plant during t period.

Preferably, the step S3 includes:

according to the purchase price, the sale price and the demand response compensation price of a trading among the users and the virtual power plant during t period, with a goal of minimizing the cost of the user, optimizing the distributed energy equipment output and the demand response of the user, determining the purchase electricity quantity or the sale electricity quantity of a trading between the user and the virtual power plant, as well as the charging capacity or discharging capacity of the energy storage device, and forming the final trading scheme of the user.

Preferably, a cost function of the user is as follow:

$$C_{i,t} = C_{i,t}^{vpp} + C_{i,t}^{ess} + C_{i,t}^{der} - C_{i,t}^{e}$$

$$\text{s.t.}\begin{cases} C_{i,t}^{vpp} = \lambda_t^{vb}\square P_{i,t}^{vs} - \lambda_t^{vs}\square P_{i,t}^{vb} \\ C_{i,t}^{ess} = \pi^{ess}\square\left(P_{i,t}^{ch} + P_{i,t}^{dis} + P_{i,t}^{static}\right) \\ C_{i,t}^{der} = \pi^{der}\square P_{i,t}^{der} \\ C_{i,t}^{e} = \sum_{t\in T}\lambda_e\left(\Delta P_{i,t}^{s} + \Delta P_{i,t}^{c}\right) \\ P_{i,t}^{load} = P_{i,t}^{der} + P_{i,t}^{vb} - P_{i,t}^{vs} + P_{i,t}^{dis} - P_{i,t}^{ch} + \Delta P_{i,t}^{s} + \Delta P_{i,t}^{c} \\ E_{i,t} = E_{i,t-\Delta t} + P_{i,t}^{ch}\square\eta_{ch} - \frac{P_{i,t}^{dis}}{\eta_{dis}} \\ 0 \le E_{i,t} \le \overline{E}_i \\ 0 \le P_{i,t}^{dis} \le \overline{P}_{i,t}^{dis}\square D_t^{dis} \\ 0 \le P_{i,t}^{ch} \le \overline{P}_t^{ch}\square D_t^{ch} \\ D_t^{static}\square P_t^{static} = 0 \\ D_i^{dis} + D_t^{ch} + D_t^{static} \le 1 \\ 0 \le P_{i,t}^{der} \le \overline{P}_{i,t}^{der} \end{cases}$$

wherein, $C_{i,t}$ is electricity cost of the user i during t period, $$C_{i,t}^{vpp}$$

is electricity cost of a trading between user i and the virtual power plant during t period;

$$C_{i,t}^{ess}$$

is an energy storage cost of user i during t period;

$$C_{i,t}^{der}$$

is a distributed energy equipment generation cost of user i during t period;

$$C^{e}_{i,t}$$

is an incentive revenue obtained by user i participating in the demand response during t period;

$$P^{vb}_{i,t} \text{ and } P^{vs}_{i,t}$$

are the purchase electricity quantity and planned sale electricity quantity between user i and the virtual power plant during t period, respectively;

$$P^{ch}_{i,t} \text{ and } P^{dis}_{i,t}$$

are the charging capacity and discharging capacity of the energy storage device of user i during t period, respectively;

$$P^{load}_{i,t}$$

is the final load demand of user i during t period;

$$P^{der}_{i,t}$$

is the distributed energy equipment output data of user i during t period.

Preferably, before performing the step S1, the method further includes: S0. assigning a permission to the user to participate in electricity trading;

and/or;

after executing step S4, the method further includes: S5. recording real-time trading data in a blockchain in a form of blocks, and executing a violation management and a payment management.

In a second aspect, the disclosure provides a blockchain-based electricity trading system in a virtual power plant environment, and the system includes:

an initial plan obtaining module, configured to aim at minimizing a planned electricity cost of the user i during t period based on a planned load demand of user i during t period, a distributed energy equipment output forecasting data of user i during t period and an energy storage device state during a previous t period, as well as a purchase price and sale price of a trading with a virtual power plant during the previous t period, optimize the cost of the user participating in the electricity trading, determine a planned purchase electricity quantity or sale electricity quantity of a trading between the user and the virtual power plant and a planned charging capacity or discharging capacity of the energy storage device, and obtain an initial trading plan of user i during t period;

a game module, configured to construct a non-cooperative game model among multipleusers and the virtual power plant based on the initial trading plan of the users in the virtual power plant, and determine a purchase price, a sale price and a demand response compensation price of a trading among the users and the virtual power plant during t period;

a final scheme obtaining module, configured to determine a final load demand of user i during t period, a charging capacity or discharging capacity of the energy storage device of user i during t period, a purchase electricity quantity or sale electricity quantity of a trading with the virtual power plant of user i during t period according to the purchase price, the sale price and the demand response compensation price of a trading among the users and the virtual power plant during t period, and form a final trading scheme;

a matching module, configured to match both trading parties, generate a trading contract and perform a verification based on the final trading scheme during t period.

In a third aspect, the disclosure provides a computer readable storage medium. The storage medium stores a computer program used for a blockchain-based electricity trading system in a virtual power plant environment, wherein the computer program enables a computer to execute the aforementioned blockchain-based electricity trading method in a virtual power plant environment.

In a fourth aspect, the disclosure provides an electronic device, including:

one or more processors;

a memory; and one or more programs, wherein the one or more programs are stored in the memory and configured to be executed by the one or more processors, and the programs may be configured to execute the aforementioned blockchain-based electricity trading method in a virtual power plant environment.

(3) Beneficial Effects

The disclosure provides a blockchain-based electricity trading method and system in a virtual power plant environment. Compared with the prior art, the disclosure has the following beneficial effects:

In the present disclosure, based on a planned load demand of user i during t period, a distributed energy equipment output forecasting data of user i during t period, an energy storage device state during a previous t period and a purchase price and a sale price of a trading with a virtual power plant during the previous t period, with a goal of minimizing a planned electricity cost of the user i during t period, a cost of the user participating in the electricity trading is optimized, a planned purchase electricity quantity or sale electricity quantity of the trading between the user and the virtual power plant, as well as a planned charging capacity or discharging capacity of the energy storage device are determined, and an initial trading plan of user i during t period is obtained; then, based on the initial trading plans of the users in the virtual power plant, a non-cooperative game model among multiple users and the virtual power plant is constructed, a purchase price, a sale price and a demand response compensation price of a trading among the users and the virtual power plant during t period are determined; then, according to the purchase price, the sale price and the demand response compensation price of a trading between the user and the virtual power plant during t period, a final load demand of user i, a charging capacity or discharging capacity of the energy storage device, as well as a purchase electricity quantity or sale electricity quantity of a trading with the virtual power plant during t period are determined, and a final trading scheme is formed; finally, based on the final trading scheme during t period, both trading parties are matched, a trading contract is generated and a verification is performed. In the embodiments of the present disclosure, based on trading information submitted by nodes participating in the trading to a blockchain in the blockchain-based power system, a supply demand plan can be obtained in real time, and an electricity generation plan of an electricity generation unit, particularly an electricity generation index of non-renewable energy sources, can be adjusted in real time, thereby an invalid production capacity is avoided and an energy utilization rate is improved.

BRIEF DESCRIPTION OF THE DRAWINGS

In order to explain the embodiments of the present disclosure or the technical solutions in the prior art more clearly, the following drawings that need to be used in the description of the embodiments or the prior art are briefly introduced. Obviously, the drawings in the following description are only embodiments of the present disclosure. For those of ordinary skill in the art, other drawings can be obtained based on the drawings disclosed without creative work.

FIG. 1 is a block diagram of a blockchain-based electricity trading method in a virtual power plant environment in the embodiments of the disclosure;

DETAILED DESCRIPTION OF THE EMBODIMENTS

Figure 2:
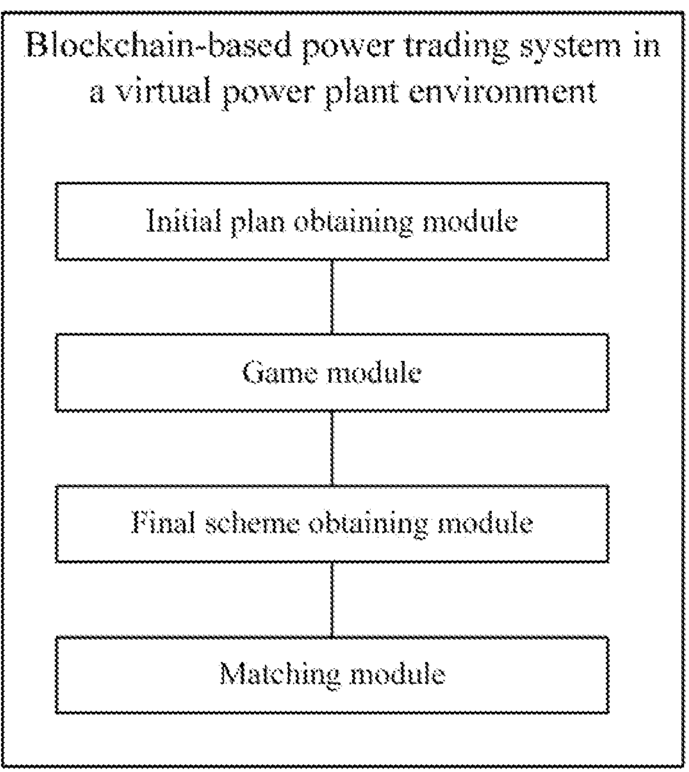
FIG. 2 is a block diagram of a blockchain-based electricity trading system in a virtual power plant environment in the embodiments of the disclosure.

In order to make the purpose, technical solutions and advantages of the embodiments of the disclosure clearer, the technical solutions of the embodiments of the present disclosure will be clearly and completely described below. Obviously, the described embodiments are only part of the embodiments of the present disclosure, not all of them. Based on the embodiments of the disclosure, all other embodiments made by those skilled in the art without any creative effort should fall within the protection scope of the disclosure.

By providing a blockchain-based electricity trading method and system in a virtual power plant environment, the embodiments of the present disclosure solve the technical problem of low energy utilization in the existing power system in a virtual power plant environment, achieves real-time access to supply and demand plans, timely adjusts the electricity generation plan of the electricity generation unit, and improves the distributed energy utilization rate.

The technical solutions in the embodiments of the present disclosure are to solve the above technical problems, and the overall idea is as follows:

In order to implement coordination control and energy management of distributed energy resources, flexible control over a large number of distributed energy resources may be implemented by using a virtual power plant. With the support of advanced communication and adjustment technologies, a virtual power plant dynamically aggregates distributed energy resources, controllable loads and energy storage systems into a whole, which can participate in the electricity market and assistively service market operation, thereby implementing bidirectional exchange of power and information of trading subjects. However, with the incorporation of a large number of prosumers into a trading market, the operation of existing virtual power plants is faced with a relatively large challenge: (1) the virtual power plant is difficult to deal with characteristics such as randomness, fluctuation and intermittency of distributed energy resources, and therefore it is often difficult to achieve an ideal utilization rate and an overall profit when controlling distributed energy resources; (2) the benefit allocation mechanism of the existing blockchain-based electricity trading scheme in the virtual power plant is mostly based on the quotes of the users themselves, which is not conducive to promoting the initiatives and overall benefits of the users participating in the trading, and increases the trading cost and credit cost in the trading process; (3) the existing virtual power plants realize information and data scheduling among main bodies participating in a trading market, such as an electricity generation side and an electricity demand side, by means of a bidirectional communication technology. However, there is no guarantee system for information security of the virtual power plant, and there is a risk of unauthorized acquisition of data and malicious tampering.

In order to solve the above-described problems, the embodiments of the present disclosure provide a blockchain-based electricity trading method and system in a virtual power plant environment. The blockchain technology has the characteristics of decentralization, security, reliability, anonymization, etc., and provides a reliable environment for the problem of data interoperability and information security in grid connections of distributed energy resources in a virtual power plant.

The embodiments of the present disclosure provide a blockchain-based electricity trading method in a virtual power plant environment as shown in FIG. 1, and the method is executed by the electricity trading system, including:

S1. based on a planned load demand of user i during t period, a distributed energy equipment output forecasting data of user i during t period, an energy storage device state during a previous t period and a purchase price and a sale price of a trading with a virtual power plant during the previous t period, with a goal of minimizing a planned electricity cost of the user during t period, optimizing a cost of the user participating in the electricity trading, determining a planned purchase electricity quantity or sale electricity quantity of the trading between the user and the virtual power plant, as well as a planned charging capacity or discharging capacity of the energy storage device, and obtaining an initial trading plan of user i during t period;

S2. based on the initial trading plan of the user in the virtual power plant, constructing a non-cooperative game model among multiple users and the virtual power plant, determining a purchase price, a sale price and a demand response compensation price of a trading among the users and the virtual power plant during t period;

S3. according to the purchase price, the sale price and the demand response compensation price of a trading among the users and the virtual power plant during t period, determining a final load demand of user i, a charging capacity or discharging capacity of the energy storage device, as well as a purchase electricity quantity or sale electricity quantity of a trading with the virtual power plant during t period, and forming a final trading scheme; and S4. based on the final trading scheme during t period, matching both trading parties, generating a trading contract and performing a verification.

Based on the trading information submitted to the blockchain by the nodes participating in the trading in the power system of the blockchain, the embodiments of the present disclosure can obtain the supply and demand plan in real time, adjust the electricity generation plan of the electricity generation unit in real time, especially the electricity production index of non-renewable energy, avoid invalid capacity, and improve the energy utilization rate.

Each step is described in detail below:

It should be noted that, in the embodiments of the present disclosure, the "user" and the "user node" may be interchanged, and both represent the nodes of the trading users in the blockchain. The power system in the embodiments of the present disclosure is a distributed electricity trading platform based on a blockchain.

It should be noted that, in the specific implementation process, when a user joins in the electricity trading system for the first time, the method further includes: S0. assigning a permission to the user to participate in electricity trading, specifically:

The user submits a registration application to the regulatory authority of the blockchain-based electricity trading system in the virtual power plant, then the electricity trading system assigns a permission to the user to participate in electricity trading, which includes a set of public key $K_p$, private key $K_s$ and wallet addressee W.

In step S1, based on a planned load demand $$P_{i,t}^{load'}$$

of user i, a distributed energy equipment output forecasting data $$P_{i,t}^{der'}$$

of user i, an energy storage device state $E_{i,t-\Delta t}$ of user i during a previous t period and a purchase price $$\lambda_{t-\Delta t}^{vb}$$

and sale price $$\lambda_{t-\Delta t}^{vs}$$

of a trading with a virtual power plant during the previous t period, aiming at minimizing a planned electricity cost of the user during t period, the cost of the user participating in the electricity trading is optimized, a planned purchase electricity quantity $$P_{i,t}^{vb'}$$

or sale electricity quantity $$P_{i,t}^{vs'}$$

of a trading between the user and the virtual power plant, as well as a planned charging capacity $$P_{i,t}^{ch'}$$

or discharging capacity $$P_{i,t}^{dis'}$$

of the energy storage device are determined, and an initial trading plan $$< P_{i,t}^{load'}, P_{i,t}^{der'}, P_{i,t}^{ch'}, P_{i,t}^{dis'}, P_{i,t}^{vb'}, P_{i,t}^{vs'} >$$

of user i during t period is obtained. The specific implementation process is as follows:

Firstly, a planned load demand $$P_{i,t}^{load'}$$

of user i during t period, a distributed energy equipment output forecasting data $$P_{i,t}^{der'}$$

of user i during t period, an energy storage device state $E_{i,t-\Delta t}$ user i during a previous t period and a purchase price $$\lambda_{t-\Delta t}^{vb}$$

and sale price $$\lambda_{t-\Delta t}^{vs}$$

of a trading with a virtual power plant during the previous t period are obtained.

Then, based on the planned load demand $$P_{i,t}^{load'}$$

of user i during t period, the distributed energy equipment output forecasting data $$P_{i,t}^{der'}$$

of user i during t period, the energy storage device state $E_{i,t-\Delta t}$ of user i during the previous t period and the purchase price $$\lambda_{t-\Delta t}^{vb}$$

and sale price $$\lambda_{t-\Delta t}^{vs}$$

of the trading with the virtual power plant during the previous t period, aiming at minimizing a planned electricity cost $$C'_{i,t}$$

of the user i during t period, the cost of the user i participating in the electricity trading is optimized, a planned purchase electricity quantity $$P_{i,t}^{vb'}$$

or sale electricity quantity $$P_{i,t}^{vs'}$$

of a trading between the user and the virtual power plant and a planned charging capacity $$P_{i,t}^{ch'}$$

or discharging capacity $$P_{i,t}^{dis'}$$

of the energy storage device of user i during t period are determined, and an initial trading plan $$\langle P_{i,t}^{load'}, P_{i,t}^{der'}, P_{i,t}^{ch'}, P_{i,t}^{dis'}, P_{i,t}^{vb'}, P_{i,t}^{vs'} \rangle$$

of user i during t period is obtained.

A planned electricity cost function of user i is:

$$C'_{i,t} = C_{i,t}^{vpp'} + C_{i,t}^{ess'} + C_{i,t}^{der'}$$

-continued $$\text{s.t.} \begin{cases} C_{i,t}^{vpp'} = \lambda_{t-\Delta t}^{vb} \square P_{i,t}^{vb'} - \lambda_{t-\Delta t}^{vs} \sqsupset P_{i,t}^{vs'} \\ C_{i,t}^{ess'} = \pi_i^{ess} \square \left( P_{i,t}^{ch'} + P_{i,t}^{des'} + P_{i,t}^{static'} \right) \\ C_{i,t}^{der'} = \pi_i^{der} \square P_{i,t}^{der'} \\ P_{i,t}^{load'} = P_{i,t}^{der'} + P_{i,t}^{vb'} - P_{i,t}^{vs'} + P_{i,t}^{dis'} - P_{i,t}^{ch'} \\ E'_{i,t} = E_{i,t-\Delta t} + P_{i,t}^{ch'} \square \eta_{ch} - \frac{P_{i,t}^{dis'}}{\eta_{dis}} \\ 0 \le E'_{i,t} \le \overline{E}_i \\ 0 \le P_{i,t}^{dis'} \le \overline{P}_{i,t}^{dis} \square D_t^{dis} \\ 0 \le P_{i,t}^{ch'} \le \overline{P}_t^{ch} \square D_t^{ch} \\ D_t^{static} \square P_t^{static'} = 0 \\ D_i^{dis} + D_t^{ch} + D_t^{static} \le 1 \\ 0 \le P_{i,t}^{der'} \le \overline{P}_{i,t}^{der} \end{cases},$$

wherein, $$C'_{i,t}$$

is a planned electricity cost of user i during t period;

$$C_{i,t}^{vpp'}$$

is a planned cost of a trading between user i and the virtual power plant during t period;

$$C_{i,t}^{ess'}$$

is a planned energy storage cost of user i during t period;

$$C_{i,t}^{der'}$$

is a planned distributed energy equipment generation cost of user i during t period;

$$\pi_i^{ess}$$

is a unit cost of energy storage of user i;

$$P_{i,t}^{static'}$$

is a planned energy storage static state of user i during t period;

$$\pi_i^{der}$$

is an unit cost of own distributed energy resources equipment output of user i; $\eta_{ch}$ and $\eta_{dis}$ is a charging efficiency and discharging efficiency of the energy storage respectively; $\overline{E}_i$ is an maximum capacity limit of the energy storage device of user i;

$$E'_{i,t}$$

is a planned energy storage capacity of user i during t period; $E_{i,t-\Delta t}$ is an energy storage capacity of user i in the previous t period;

$$\overline{P}_t^{ch}$$

and $$\overline{P}_t^{dis}$$

is an upper limit of charging and discharging of the energy storage device during t period respectively;

$$D_t^{ch}, D_t^{dis} \text{ and } D_t^{static}$$

are 0-1 variables representing the charging, discharging, and static states of the energy storage device during t period;

$$\overline{P}_{i,t}^{der}$$

is a maximum electricity generation of the distributed energy equipment of user i during t period;

$$P_{i,t}^{load\prime}$$

is the planned load demand of user i during t period;

$$P_{i,t}^{der\prime}$$

is the distributed energy equipment output forecasting data of user i during t period;

$$\lambda_{t-\Delta t}^{vb} \text{ and } \lambda_{t-\Delta t}^{vs}$$

are the purchase price and the sale price of a trading between the user and the virtual power plant during a previous t period;

$$P_{i,t}^{vb\prime} \text{ and } P_{i,t}^{vs\prime}$$

are the planned purchase electricity quantity and the planned sale electricity quantity of a trading between user i and the virtual power plant during t period;

$$P_{i,t}^{ch\prime} \text{ and } P_{i,t}^{dis\prime}$$

are the planned charging capacity and the planned discharging capacity of the energy storage device of user i during t period respectively.

In the specific implementation process, the user node submits its own initial trading plan $$< P_{i,t}^{load\prime}, P_{i,t}^{der\prime}, P_{i,t}^{ch\prime}, P_{i,t}^{dis\prime}, P_{i,t}^{vb\prime}, P_{i,t}^{vs\prime} >$$

to the blockchain rotation endorsing node based on the optimized results.

It should be noted that in the embodiments of the disclosure, the forecasting data such as the distributed energy equipment output forecasting data can be obtained through various existing forecasting methods, which will not be repeated here.

In step S2, based on the initial trading plans of the users in the virtual power plant, a non-cooperative game model among multiple users and the virtual power plant is constructed, a purchase price, a sale price and a demand response compensation price of a trading between the user and the virtual power plant during t period are determined. The specific implementation process is as follows:

After all user nodes submit the initial trading plan, a non-cooperative game model among multiple users and the virtual power plant is constructed. The virtual power plant controls the electricity trading among the users and the virtual power plant by adjusting the electricity trading price with each user, so as to reduce the peak-valley difference of the main grid and the electricity supply pressure of the main grid during the peak period of electricity consumption. By adjusting the trading price among the virtual power plant and the users, and aiming at minimizing the operation cost of all entities of the virtual power plant, the virtual power plant determines the sale price $$\lambda_t^{vs},$$

purchase price $$\lambda_t^{vb}$$

and demand response compensation price $\lambda_e$ of the trading between the user in the virtual power plant and the virtual power plant during t period, and adjusts the internal demand response and distributed energy equipment output of the system according to the obtained purchase price, sale price and demand response compensation price.

After all user nodes submit the initial trading plans, the virtual power plant operator and users, as different interest subjects, have different goals. The process of adjusting the electricity trading quantity and trading price and conducting electricity trading through rational decision-making is a typical non-cooperative game process. Therefore, the non-cooperative game model between the user and the virtual power plant is as follows:

$$G = (L; S; U)$$

wherein, L, S and U are the three elements of the game model: participants, strategies and utility. Participants refer to virtual power plant and user nodes submitting trading plans. A trading electricity quantity among users and virtual power plant during t period is as the game strategy, and a trading electricity price among virtual power plant and users is as the game strategy. a utility function of the user is as follows:

$$U_{i,t} = -C'_{i,t}$$

a utility function of the virtual power plant is as follows:

$$U_t^{VPP} = C_t^{sell} - C_t^{buy} + C_t^{grid} + C_t^e$$

The virtual power plant considers its own utility and the operation stability of the power system when controlling the trading price with users, so the utility function of the virtual power plant mainly consists of the revenue from the sale of energy of the main grid and the demand response compensation for the volatility loss caused by users participating in the demand response, wherein, $$U_t^{VPP}$$

is an overall cost of the virtual power plant during t period;

$$C_t^{buy} \text{ and } C_t^{sell}$$

are an electricity purchase cost and an electricity sale cost from users participating in a trading to the virtual power plant;

$$C_t^e$$

is an incentive cost of compensation for user participation in demand response in the virtual power plant;

$$C_t^{grid}$$

is a cost of trading with the main grid; and the utility function of the virtual power plant is constrained as follows:

$$\text{s.t.} \begin{cases} C_t^{sell} = \lambda_t^{vs} \sum_{i=1}^{N} P_{i,t}^{vb} \\ C_t^{buy} = \lambda_t^{vb} \sum_{i=1}^{N} P_{i,t}^{vs} \\ C_t^{grid} = \max\left(\sum_{i=1}^{N} P_{i,t}^{b} - \sum_{i=1}^{N} P_{i,t}^{s}, 0\right)\lambda_t^{gs} + \min\left(\sum_{n=1}^{N} P_{i,t}^{b} - \sum_{n=1}^{N} P_{i,t}^{s}, 0\right)\lambda_t^{gb} \\ C_t^e = \sum_{i=1}^{N}\sum_{t\in T} \lambda_e\left(\Delta P_{i,t}^s + \Delta P_{i,t}^c\right) \\ \lambda_t^{gb} < \lambda_t^{vs} < \lambda_t^{gs} \\ \lambda_t^{gb} < \lambda_t^{vb} < \lambda_t^{gs} \\ \lambda_t^{gb} < \lambda_e < \lambda_t^{gs} \end{cases}$$

wherein, $$\lambda_t^{gs} \text{ and } \lambda_t^{gb}$$

are sale price and purchase price of a trading between the virtual power plant and the main grid;

$$\Delta P_{i,t}^s$$

is a translatable load of the user i during t period;

$$\Delta P_{i,t}^c$$

is a reducible load of the user i during t period, N is the number of users participating in the virtual power plant trading, and T is a total time period of users participating in the virtual power plant trading;

$$\lambda_t^{vb}, \lambda_t^{vs} \text{ and } \lambda_e$$

are purchase price, sale price and demand response compensation price of the trading among users and virtual power plant during t period.

In step S3, according to the purchase price $$\lambda_{i,t}^{vb},$$

the sale price $$\lambda_{i,t}^{vs}$$

and the demand response compensation price $\lambda_e$ of a trading between the user and the virtual power plant during t period, a final trading scheme of the user i is determined. The specific implementation process is as follows:

Based on the given purchase price and sale price between the internal user and the virtual power plant, the distributed energy output and demand response of the user are optimized to obtain the final cost function of the user. Specifically:

Based on the optimization results of step S1 and step S2, according to the purchase price, the sale price and demand response compensation price of the trading between the user and the virtual power plant in a given t period, with the goal of minimizing the cost $C_{i,t}$ of the user i, the distributed energy output and the demand response of the user i is optimized, the purchase electricity quantity $$P_{i,t}^{vb}$$

or sale electricity quantity $$P_{i,t}^{vs}$$

of the trading between the user and the virtual power plant, as well as the charging capacity $$P_{i,t}^{ch}$$

or discharging capacity $$P_{i,t}^{dis}$$

of the energy storage device are determined. A cost function of the user i is as follows:

$$C_{i,t} = C_{i,t}^{vpp} + C_{i,t}^{ess} + C_{i,t}^{der} - C_{i,t}^{e}$$

$$\text{s.t.} \begin{cases} C_{i,t}^{vpp} = \lambda_t^{vb} \square P_{i,t}^{vs} - \lambda_t^{vs} \square P_{i,t}^{vb} \\ C_{i,t}^{ess} = \pi^{ess} \square \left( P_{i,t}^{ch} + P_{i,t}^{dis} + P_{i,t}^{static} \right) \\ C_{i,t}^{der} = \pi^{der} \square P_{i,t}^{der} \\ C_{i,t}^{e} = \sum_{t \in T} \lambda_e \left( \Delta P_{i,t}^{s} + \Delta P_{i,t}^{c} \right) \\ P_{i,t}^{load} = P_{i,t}^{der} + P_{i,t}^{vb} - P_{i,t}^{vs} + P_{i,t}^{dis} - P_{i,t}^{ch} + \Delta P_{i,t}^{s} + \Delta P_{i,t}^{c} \\ E_{i,t} = E_{i,t-\Delta t} + P_{i,t}^{ch} \square \eta_{ch} - \dfrac{P_{i,t}^{dis}}{\eta_{dis}} \\ 0 \leq E_{i,t} \leq \overline{E}_i \\ 0 \leq P_{i,t}^{dis} \leq \overline{P}_{i,t}^{dis} \square D_t^{dis} \\ 0 \leq P_{i,t}^{ch} \leq \overline{P}_t^{ch} \square D_t^{ch} \\ D_t^{static} \square P_t^{static} = 0 \\ D_i^{dis} + D_t^{ch} + D_t^{static} \leq 1 \\ 0 \leq P_{i,t}^{der} \leq \overline{P}_{i,t}^{der} \end{cases}$$

wherein, $C_{i,t}$ is electricity cost of the user i during t period, $$C_{i,t}^{vpp}$$

is a cost of a trading between user i and the virtual power plant during t period;

$$C_{i,t}^{ess}$$

is an energy storage cost of user i during t period;

$$C_{i,t}^{der}$$

is a distributed energy equipment generation cost of user i during t period;

$$C_{i,t}^{e}$$

is an incentive revenue obtained by user participating in the demand response during t period;

$$P_{i,t}^{vb} \text{ and } P_{i,t}^{vs}$$

are the purchase electricity quantity and sale electricity quantity between user i and the virtual power plant during t period;

$$P_{i,t}^{ch} \text{ and } P_{i,t}^{dis}$$

are the charging capacity and discharging capacity of the energy storage device of user i during t period respectively;

$$P_{i,t}^{load}$$

is the final load demand of user i during t period;

$$P_{i,t}^{der}$$

is a distributed energy equipment output data of user i during t period.

According to the cost function of the individual user, the purchase electricity quantity $$P_{i,t}^{vb}$$

or sale electricity quantity $$P_{i,t}^{vs}$$

of the trading between the user and the virtual power plant, as well as the charging capacity $$P_{i,t}^{ch}$$

or discharging capacity $$P_{i,t}^{dis}$$

of the energy storage device during t period are determined, and the final trading scheme $$\langle P_{i,t}^{load}, P_{i,t}^{der}, P_{i,t}^{ch}, P_{i,t}^{dis}, P_{i,t}^{vb}, P_{i,t}^{vs} \rangle$$

the user is formed.

In step S4, based on the final trading scheme during t period, both trading parties are matched, a trading contract is generated and a verification is performed. The specific implementation process is as follows:

According to the cost function of the individual user, the final trading scheme $$\langle P_{i,t}^{load}, P_{i,t}^{der}, P_{i,t}^{ch}, P_{i,t}^{dis}, P_{i,t}^{vb}, P_{i,t}^{vs} \rangle$$

during t period is obtained. The user node submits the final trading role and the trading electricity quantity of this period to the blockchain rotation endorsing node. Based on the trading information submitted by the user, the both trading parties in the virtual power plant are matched and the trading contract is automatically generated. All the rotation endorsing nodes of the blockchain verify the trading contract and send the same to the orderer node of the blockchain where the trading subject is located. The orderer node packages all the passed trading contracts into blocks, and updates the blockchain where both parties of the trading subjects are located.

In the specific implementation process, the method further includes: S5. recording real-time trading data in a blockchain in a form of blocks, and executing a violation management and a payment management. The specific implementation process is as follows:

The user node conducts the trading based on the trading contract and records real-time trading data in the blockchain in the form of blocks. If the user node fails to perform the contract or breaches the contract during the trading process, the power system in the virtual power plant determines that the party at fault will bear the corresponding liability for breach of contract and pay high liquidated damages. If the trading contract is successfully performed, the power system will automatically transfer the trading cost based on the actual trading data information provided by the smart meter, and record the actual trading data in the blockchain in the form of blocks to complete the electricity trading.

The embodiments of the present disclosure further provide a blockchain-based power trading system in a virtual power plant environment, as shown in FIG. 2, including:

an initial plan obtaining module, configured to aim at minimizing a planned electricity cost of the user i during t period based on a planned load demand of user i during t period, a distributed energy equipment output forecasting data of user i during t period and an energy storage device state of user i during previous t period, as well as a purchase price and sale price of a trading with a virtual power plant during the previous t period, optimize the electricity cost of the user participating in the electricity trading, determine a planned purchase electricity quantity or sale electricity quantity of a trading between the user and the virtual power plant and a planned charging capacity or discharging capacity of the energy storage device, and obtain an initial trading plan of user i during t period;

a game module, configured to construct a non-cooperative game model among multiple users and the virtual power plant based on the initial trading plan of the user in the virtual power plant, and determine a purchase price, a sale price and a demand response compensation price of a trading between the user and the virtual power plant during t period;

a final scheme obtaining module, configured to determine a final load demand of user i, a charging capacity or discharging capacity of the energy storage device of user i, a purchase electricity quantity or sale electricity quantity of a trading with the virtual power plant during t period according to the purchase price, the sale price and the demand response compensation price of a trading between the user and the virtual power plant during t period, and form a final trading scheme;

a matching module, configured to match both trading parties, generate a trading contract and perform a verification based on the final trading scheme during t period.

It is understandable that the blockchain-based electricity trading system in a virtual power plant environment provided by the embodiments of the disclosure corresponds to the above blockchain-based electricity trading method in a virtual power plant environment, and the explanation, examples and beneficial effects of the relevant contents thereof may refer to the corresponding contents in the blockchain-based electricity trading method in a virtual power plant environment, which will not be repeated here.

The embodiments of the present disclosure further provide a computer readable storage medium. The storage medium stores a computer program used for a blockchain-based electricity trading system in a virtual power plant environment, wherein the computer program enables a computer to execute the aforementioned blockchain-based electricity trading method in a virtual power plant environment.

The embodiments of the present disclosure further provide an electronic device, including:

one or more processors;

a memory; and one or more programs, wherein the one or more programs are stored in the memory and configured to be executed by the one or more processors, and the programs may be configured to execute the aforementioned blockchain-based electricity trading method in a virtual power plant environment.

In conclusion, compared wtih the prior art, there are the following beneficial effects:

1. In the embodiments of the present disclosure, based on trading information submitted by nodes participating in the trading to a blockchain platform in the blockchain-based electricity trading system, a supply demand plan can be obtained in real time, and an electricity generation plan of a electricity generation unit, particularly an electricity generation index of non-renewable energy resources, can be adjusted in real time, thereby an invalid production capacity is avoided and an energy utilization rate is improved.
2. The power system of the embodiments of the present disclosure is a blockchain-based distributed trading system, and has the characteristics of decentralization, openness and transparency, and tamper resistance.

Accurate trading information can help the stable scheduling of a virtual power plant, improving the process of peak cutting and valley filling of energy demand, and facilitating information transparency and stable scheduling of the virtual power plant.

3. In the embodiments of the present disclosure, trading data is encrypted by means of an encryption algorithm of a blockchain so as to implement protection, and is mutually authenticated by various nodes of the whole network. Each node in the blockchain backs up all the information in the blockchain, which effectively solves the hidden trouble of failure of the centralized data service, improves the robustness of the system, and protects the privacy security of user information.

4. The overall benefits of the virtual power plant are maximized while the trading cost of users are reduced as much as possible, which can effectively facilitate the users in the virtual power plant to actively participate in electricity trading and improve the economy of the virtual power plant at the same time.

It should be noted that, in this specification, relational terms such as first and second are only used to distinguish one entity or operation from another entity or operation, and do not require or imply any actual relationship or sequence between these entities or operations. Furthermore, the terms "comprise", "include", or any other variants thereof are intended to cover a non-exclusive inclusion, so that a process, a method, an article, or a device that includes a series of elements not only includes those elements, but also includes other elements that are not explicitly listed, or further includes elements inherent to the process, the method, the article, or the device. An element limited by "comprise a . . . " does not exclude other same elements existing in a process, a method, an article, or a device that includes the element, unless otherwise specified.

The foregoing embodiments are merely intended to illustrate the technical solutions of the present disclosure, but not to limit the present disclosure. Although the present disclosure is described in detail with reference to the foregoing embodiments, persons of ordinary skill in the art should understand that they can still make modifications to the technical solutions described in the foregoing embodiments or make equivalent replacements to some technical features thereof, these modifications or replacements do not make the essence of the corresponding technical solutions depart from the spirit and scope of the technical solutions of the embodiments of the present disclosure.

What is claimed is:

1. A method for trading electricity between distributed energy equipment and users based on block chain, comprising:

S1. based on a planned load demand of user i during/ period, a distributed energy equipment output forecasting data of user i during/period, an energy storage device state of user i during a previous & period and a purchase price and a sale price of a trading with a virtual power plant of user i during the previous t period, with a goal of minimizing a planned electricity cost of the user i during t period, optimizing a cost of the user i participating in the electricity trading, determining a planned purchase electricity quantity or sale electricity quantity of the trading between the user i and the virtual power plant, as well as a planned charging capacity or discharging capacity of the energy storage device, and obtaining an initial trading plan of user i during t period;

S2. based on the initial trading plan of the user in the virtual power plant, constructing a non-cooperative game model among multiple users and the virtual power plant, determining a purchase price, a sale price and a demand response compensation price of a trading between the user and the virtual power plant during t period;

S3. according to the purchase price, the sale price and the demand response compensation price of a trading between the user and the virtual power plant during t period, determining a final load demand of user i, a charging capacity or discharging capacity of the energy storage device, as well as a purchase electricity quantity or sale electricity quantity of a trading with the virtual power plant during t period, and forming a final trading scheme indicating the output power for each distributed energy equipment; and S4. based on the final trading scheme during t period, matching both trading parties, generating a trading contract and performing a verification;

S5. recording real-time trading data in a block chain in a form of blocks, and executing a violation management and a payment management; and S6. powering, by the distributed energy equipment to the user according to the final trading scheme;

wherein the step S3 comprises:

according to the purchase price, the sale price and the demand response compensation price of a trading between the user and the virtual power plant during t period, with a goal of minimizing the cost of the user, optimizing the distributed energy output and the demand response of the user, determining the purchase electricity quantity or sale electricity quantity of a trading between the user and the virtual power plant, as well as the charging capacity or discharging capacity of the energy storage device, and forming the final trading scheme of the user.

2. The method of claim 1, wherein a planned electricity cost function of user i is:

$$C'_{i,t} = C^{vpp'}_{i,t} + C^{ess'}_{i,t} + C^{der'}_{i,t}$$

$$s.t.\begin{cases} C^{vpp'}_{i,t} = \lambda^{vb}_{t-\Delta t}\square P^{vb'}_{i,t} - \lambda^{vs}_{t-\Delta t}\square \mathrm{P}^{vs'}_{i,t} \\ C^{ess'}_{i,t} = \pi^{ess}_{i}\square\left(P^{ch'}_{i,t} + P^{dis'}_{i,t} + P^{static'}_{i,t}\right) \\ C^{der'}_{i,t} = \pi^{der}_{i}\square P^{der'}_{i,t} \\ P^{load'}_{i,t} = P^{der'}_{i,t} + P^{vb'}_{i,t} - P^{vs'}_{i,t} + P^{dis'}_{i,t} - P^{ch'}_{i,t} \\ E'_{i,t} = E_{i,t-\Delta t} + P^{ch'}_{i,t}\square\eta_{ch} - \dfrac{P^{dis'}_{i,t}}{\eta_{dis}} \\ 0 \le E'_{i,t} \le \overline{E}_{i} \\ 0 \le P^{dis'}_{i,t} \le \overline{P}^{dis}_{t}\square D^{dis}_{i,t} \\ 0 \le P^{ch'}_{i,t} \le \overline{P}^{ch}_{t}\square D^{ch}_{t} \\ D^{static}_{t}\square P^{static'}_{t} = 0 \\ D^{dis}_{t} + D^{ch}_{t} + D^{static}_{t} \le 1 \\ 0 \le P^{der'}_{i,t} \le \overline{P}^{der}_{i,t} \end{cases},$$

wherein, $$C'_{i,t}$$

is a planned electricty cost of the user i during t period;

$$C_{i,t}^{vpp\prime}$$

is a planned cost of a trading between user i and the virtual power plant t period;

$$C_{i,t}^{ess\prime}$$

is a planned energy storage cost of user i during t period;

$$C_{i,t}^{der\prime}$$

is a planned distributed energy equipment generation cost of user i during t period;

$$\pi_i^{ess}$$

is a unit cost of energy storage of user i;

$$P_{i,t}^{static\prime}$$

is a planned energy storage state of user i during t period;

$$\pi_i^{der}$$

is an unit cost of own distributed energy resources equipment output of user i; $\eta_{ch}$ and $\eta_{dis}$ is a charging efficiency and discharging efficiency of the energy storage respectively; $\overline{E}_i$ is an maximum capacity limit of the energy storage device of user i;

$$E_{i,t}'$$

is a planned energy storage capacity of user i during t period; $E_{i,t-\Delta t}$ is an energy storage capacity of user i in the previous t period;

$$\overline{P}_t^{ch} \text{ and } \overline{P}_t^{dis}$$

is an upper limit of charging and discharging of the energy storage device during t period respectively, $$D_t^{ch}, D_t^{dis} \text{ and } D_t^{static}$$

are 0-1 variables representing the charging, discharging, and static states of the energy storage device during t period;

$$\overline{P}_{i,t}^{der}$$

is a maximum electricity generation of the distributed energy equipment of user i during t period;

$$P_{i,t}^{load\prime}$$

is the planned load demand of user i during t period;

$$P_{i,t}^{der\prime}$$

is the distributed energy equipment output forecasting data of user i during t period;

$$\Delta_{t-\Delta t}^{vb} \text{ and } \lambda_{t-\Delta t}^{vs}$$

are the purchase price and the sale price of a trading between the user and the virtual power plant during a previous t period;

$$P_{i,t}^{vb\prime} \text{ and } P_{i,t}^{vs\prime}$$

are the planned purchase electricity quantity and the planned sale electricity quantity of a trading between user i and the virtual power plant during t period;

$$P_{i,t}^{ch\prime} \text{ and } P_{i,t}^{dis\prime}$$

are the planned charging capacity and the planned discharging capacity of the energy storage device of user i during t period respectively.

3. The method of claim 1, wherein the non-cooperative game model comprises:

$$G=(L;S;U)$$

wherein, L, S and U are participants, strategies and utility of the game model;

participants refer to the virtual power plant and user nodes submitting trading plans;

the strategies comprise: a trading electricity quantity among users and virtual power plant during t period, and a trading electricity price among virtual power plant and users;

the utility comprises the utility of users and the utility of virtual power plant.

4. The method of claim 3, wherein a utility function of the user is as follows:

$$U_{i,j}=-C_{i,t}'$$

a utility function of the virtual power plant is as follows:

$$U_t^{VPP}=C_t^{sell}-C_t^{buy}+C_t^{grid}+C_t^{e}$$

wherein, $$U_t^{VPP}$$

is an overall cost of the virtual power plant during t period;

$$C_t^{buy}$$

and $$C_t^{sell}$$

are an electricity purchase cost and an electricity sale cost from users participating in a trading to the virtual power plant;

$$C_t^{e}$$

is an incentive cost of compensation for users participating in demand response in the virtual power plant;

$$C_t^{grid}$$

is a cost of trading with the main grid; and the utility function of the virtual power plant is constrained as follows:

$$\text{s.t.}\begin{cases} C_t^{sell}=\lambda_t^{vs}\sum_{i=1}^{N}P_{i,t}^{vb} \\ C_t^{buy}=\lambda_t^{vb}\sum_{i=1}^{N}P_{i,t}^{vs} \\ C_t^{grid}=\max\left(\sum_{i=1}^{N}P_{i,t}^{b}-\sum_{i=1}^{N}P_{i,t}^{s},0\right)\lambda_t^{gs}+ \\ \min\left(\sum_{n=1}^{N}P_{i,t}^{b}-\sum_{n=1}^{N}P_{i,t}^{s},0\right)\lambda_t^{gb} \\ C_t^{e}=\sum_{i=1}^{N}\sum_{t\in T}\lambda_e\left(\Delta P_{i,t}^{s}+\Delta P_{i,t}^{c}\right) \\ \lambda_t^{gb}<\lambda_t^{vs}<\lambda_t^{gs} \\ \lambda_t^{gb}<\lambda_t^{vb}<\lambda_t^{gs} \\ \lambda_t^{gb}<\lambda_e<\lambda_t^{gs} \end{cases}$$

wherein, $$\lambda_t^{gs} \text{ and } \lambda_t^{gb}$$

are a sale price and purchase price of a trading between the virtual power plant and the main grid;

$$\Delta P_{i,t}^{s}$$

is a translatable load of the user i during t period;

$$\Delta P_{i,t}^{c}$$

is a reducible load of the user i during t period; N is the number of users participating in the virtual power plant trading, and T is a total time period of users participating in the virtual power plant trading;

$$\lambda_t^{vb},\ \lambda_t^{vs} \text{ and } \lambda_e$$

are the purchase price, the sale price and the demand response compensation price of the trading among users and virtual power plant during t period.

5. The method of claim 4, wherein a cost function of the user is as follow:

$$C_{i,t}=C_{i,t}^{vpp}+C_{i,t}^{ess}+C_{i,t}^{der}-C_{i,t}^{e}$$

$$\text{s.t.}\begin{cases} C_{i,t}^{vpp}=\lambda_t^{vb}\square P_{i,t}^{vss}-\lambda_t^{vs}\square P_{i,t}^{vb} \\ C_{i,t}^{ess}=\pi^{ess}\square\left(P_{i,t}^{ch}+P_{i,t}^{dis}+P_{i,t}^{static}\right) \\ C_{i,t}^{der}=\pi^{der}\square P_{i,t}^{der} \\ C_{i,t}^{e}=\sum_{t\in T}\lambda_e\left(\Delta P_{i,t}^{s}+\Delta P_{i,t}^{c}\right) \\ P_{i,t}^{load}=P_{i,t}^{der}+P_{i,t}^{vb}-P_{i,t}^{vs}+P_{i,t}^{dis}-P_{i,t}^{ch}+\Delta P_{i,t}^{s}+\Delta P_{i,t}^{c} \\ E_{i,t}=E_{i,t-\Delta t}+P_{i,t}^{ch}\square\eta_{ch}-\frac{P_{i,t}^{dis}}{\eta_{dis}} \\ 0\le E_{i,t}\le\overline{E}_i \\ 0\le P_{i,t}^{dis}\overline{P}_t^{dis}\square D_t^{dis} \\ 0\le P_{i,t}^{ch}\overline{P}_t^{ch}\square D_t^{ch} \\ D_t^{static}\square P_t^{static}=0 \\ D_t^{dis}+D_t^{ch}+D_t^{static}\le 1 \\ 0\le P_{i,t}^{der}\le\overline{P}_{i,t}^{der} \end{cases}$$

wherein, $C_{i,t}$ is electricity cost of the user i during t period, $$C_{i,t}^{vpp}$$

is a cost of a trading between user i and the virtual power plant during t period;

$$C_{i,t}^{ess}$$

is an energy storage cost of user i during t period;

$$C_{i,t}^{der}$$

is a distributed energy equipment generation cost of user i during t period;

$C_{i,t}^{e}$ is an incentive revenue obtained by user i participating in the demand response during t period;

$P_{i,t}^{vb}$ and $P_{i,t}^{dis}$ are the purchase electrictiy quantity and planned sale electricity quantity between user i and the virtual power plant during t period respectively;

$P_{i,t}^{ch}$ and $P_{i,t}^{dis}$ are the charging capactiy and discharging capacity of the energy storage device of user i during t period respectively;

$P_{i,t}^{load}$ is the final load demand of user i during t period;

$P_{i,t}^{der}$ is the distributed energy equipment output data of user i during t period.

6. The method of claim 1, wherein before performing the step S1, the method further comprises:

S0. assigning a permission to the user to participate in electricity trading; and after executing step S4, the method further comprises: S5. recording real-time trading data in a block chain in a form of blocks, and executing a violation management and a payment management.

7. A non-transitory computer readable storage medium, wherein the storage medium stores computer programs to be executed by a computer to execute the method of claim 1.

8. An electronic device, comprising:

one or more processors;

a memory; and one or more programs, wherein the one or more programs are stored in the memory and configured to be executed by the one or more processors, and the programs may be configured to execute the method of claim 1.

* * * * *